Figure 1:
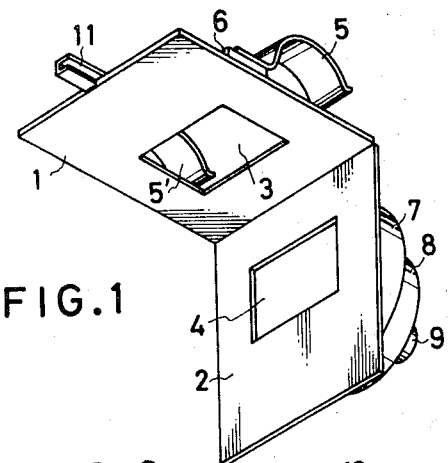

United States Patent [19]

Okayama

[11] 3,829,212

[45] Aug. 13, 1974

[54] PHOTOGRAPHIC ENLARGEMENT INSTRUMENT

[75] Inventor: Sigeru Okayama, Tokyo, Japan

[73] Assignee: Kabushiki Kaisha Medica, Tokyo, Japan; a part interest

[22] Filed: July 11, 1973

[21] Appl. No.: 378,243

[30] Foreign Application Priority Data

Mar. 16, 1973 Japan.......................... 48-32261

[52] U.S. Cl. .................................... 355/75, 355/67
[51] Int. Cl. ............................................ G03b 27/62
[58] Field of Search........................... 355/67, 71, 75

[56] References Cited
UNITED STATES PATENTS 3,241,437  3/1966  Thiels .............................. 355/67 X
3,547,536  12/1970  Phelps................................... 355/75

Primary Examiner—Samuel S. Matthews
Assistant Examiner—Richard A. Wintercorn
Attorney, Agent, or Firm—Eliot S. Gerber

[57] ABSTRACT

There is provided a photographic enlargement instrument comprising a plate-like negative film carrier having a rectangular aperture corresponding to a frame size of a negative film, means for hanging the negative film carrier from a fluorescent lamp in such a manner that the fluorescent lamp is closely adjacent to said rectangular aperture of the negative film carrier, a tubular member connected to the negative film carrier to enclose the rectangular aperture and having an enlarging lense at the other end thereof, and means for shading the fluorescent lamp except a position where the fluorescent lamp faces rectangular aperture of the negative film carrier.

11 Claims, 6 Drawing Figures

PATENTED AUG 13 1974 3,829,212

PHOTOGRAPHIC ENLARGEMENT INSTRUMENT

The present invention relates to an instrument for photographic enlargement.

In conventional instruments for photographic enlargement, an electric bulk has been used for a light source. It has been noted that the electric bulb becomes extremely hot and makes the temperature in a lamp house of the instrument extremely high, which often damages a negative film. In order to overcome and prevent the above defect, it has been tried that a heat-proof glass is employed for holding the negative film.

However, a continuous operation of the instrument for a long time sometimes appears to break or injure even the heat-proof glass, resulting in an injury or damage of the negative film.

Accordingly, an object of the present invention is to provide an instrument for photographic enlargement, in which an enlargement operation can be accomplished for a long time without damaging a negative film.

Another object of the present invention is to provide an instrument for photographic enlargement, in which a fluorescent lamp of a general desk type is used for a light source.

Another object of the present invention is to provide an instrument for photographic enlargement, which is simple in construction and can be manufactured at a relatively low cost.

Further object of the present invention is to provide an instrument for photographic enlargement, which is easily operated.

According to an aspect of the present invention, there is provided an instrument for photographic enlargement comprising a plate-like negative film carrier having a rectangular aperture corresponding to a frame size of a negative film, means for hanging the negative film carrier from a fluorescent lamp in such a manner that the fluorescent lamp is closely adjacent to said rectangular aperture of the negative film carrier, a tubular member connected to the negative film carrier to enclose the rectangular aperture and having an enlarging lense at the other end thereof, and means for shading the fluorescent lamp except a position where the fluorescent lamp faces the rectangular aperture of the negative film carrier.

Figure 4:
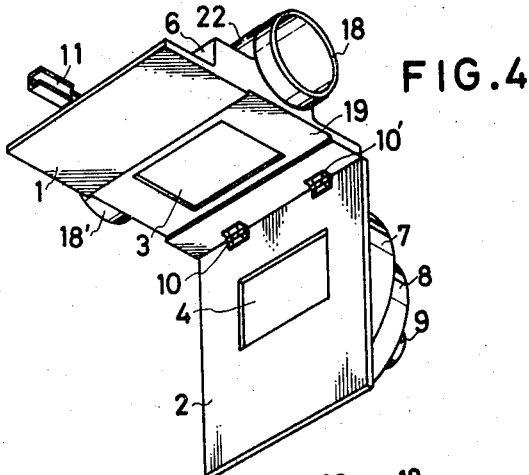
Figure 2:
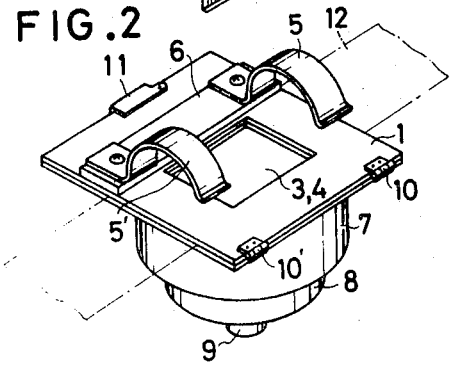
Figure 5:
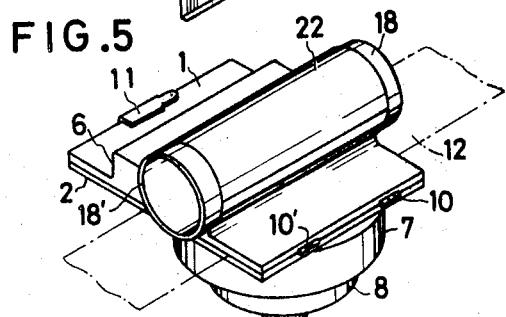
Figure 3:
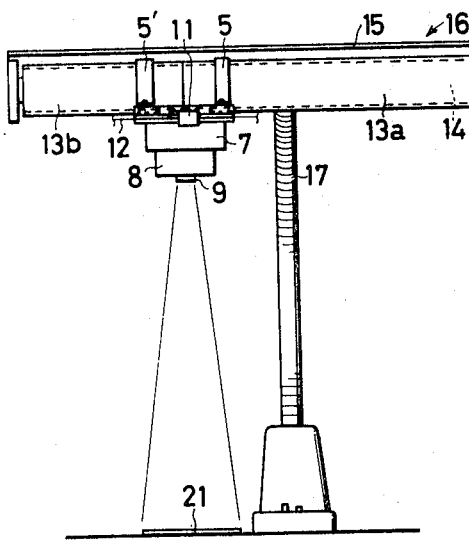
Figure 6:
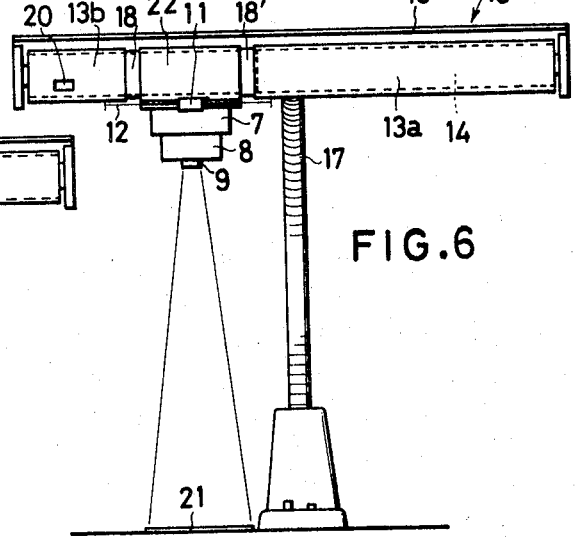

Other objects, features and advantages of the present invention will become apparent from the following description of the preferred embodiments thereof when taken in conjunction with the accompanying drawings, in which:

FIG. 1 is a perspective view of an instrument for photographic enlargement according to a first embodiment of the present invention, in which a negative film carrier of two plates is opened, and means for shading a fluorescent lamp is omitted here for simplicity, FIG. 2 is a perspective view of the instrument shown in FIG. 1, in which the negative film carrier is closed to hold a film, FIG. 3 is a side view of the instrument according to the first embodiment of the present invention, in which the instrument is attached to a fluorescent lamp of a desk type, FIG. 4 is a perspective view of the instrument according to a second embodiment of the present invention, in which two plates forming a negative film carrier are opened, and means for shading a fluorescent light bulb is omitted here for simplicity, FIG. 5 is a perspective view of the instrument shown in FIG. 4, in which the negative film carrier is closed to hold a film, and FIG. 6 is a side view of the instrument according to the second embodiment of the present invention, in which the instrument is attached to a fluorescent lamp of a desk type.

Referring now to FIGS. 1, 2, and 3, a rectangular upper plate 1 and a rectangular lower plate 2 form a negative film carrier. Each plate has, at its almost center portion, a rectangular aperture 3, 4 of 24 × 35 mm. On an upper surface of the upper plate 1, a pair of hanging members 5 and 5' are fixed at their one ends on an elongated protrusion 6. The elongated protrusion is arranged so that one side thereof is adjacent to one of longer sides of the aperture 3. The hanging member is made of elastic material and it extends upward and then laterally, ending with a downward extension so that it forms a curvature or a bow with respect to the plane of the upper plate 1. The other end of the hanging members 5 and 5' is apart from the surface of the upper plate 1.

On the lower surface of the lower plate 2 is disposed a tubular member 7 enclosing the aperture 4. The tubular member 7 is provided, at its lowest portion, with a sub-tubular member 8 smaller than the tubular 7 in diameter. At the lowest portion of the sub-tubular member is removably provided an enlarging lense 9. The tubular member 7 and the sub-tubular member 8 may be formed in a conical manner, which is decreasing its diameter as it extends downwardly, in which the enlarging lense 9 is removably mounted on a lowest and smallest portion thereof. The upper plate 1 and the lower plate 2 are pivotally connected to each other by a pair of hinges 10 and 10'. At the side opposite to the hinge side of the upper plate 1, there is rotatably disposed a fastener 11 which fastens the upper plate 1 and the lower plate 2 after one of the plates 1 and 2 is closed to face each other with a film positioned therebetween. When the negative film carrier of the two plates is closed, four sides of the aperture of the first plate 1 are registered to those of the aperture of the second plate 2 since two apertures are formed in the same size. The elongated piece 6 is adapted to abut at its one side to an inner surface of a shade cover 15 of a desk lamp 16 to help the whole instrument be positioned and hanged from the fluorescent lamp 11 in such a manner that a plane of the lense 9 is parallel to the axial horizontal plane of the fluorescent lamp 11.

As is shown in FIG. 3, the fluorescent lamp 11 is covered and shaded with a pair of tube-like enclosing members 13a and 13b which are semi-transparent or non-transparent. The tube-like enclosing member is provided with an elongated aperture (not shown) at a portion thereof which faces the upper plate 1 so that the elongated aperture of the tube-like enclosing member associates with the apertures 3 and 4 of the plates 1 and 2 in such a manner that a beam of light from the fluorescent lamp passes through the lense 9 by way of the elongated aperture and the two rectangular apertures 3 and 4.

Description will be made hereinafter how the instrument is operated. The developed negative film 12 having a plurality of frames is placed between the upper plate 1 and the lower plate so that a predetermined frame lies correctly on the rectangular apertures of the plates 1 and 2. After closing the negative film carrier, i.e. the two plates 1 and 2, having therebetween the negative film 12, the plates are fastened by the fastener 11. The fluorescent lamp 14 is removed from a pair of sockets of the desk lamp 16 and the lamp 14 is enclosed with the tube-like enclosing members 13a and 13b of semi-transparent materials. Then the bulb 14 enclosed with the tube-like enclosing members 13a and 13b is snugly mounted to the sockets. After that, the instrument of the invention is hanged from the lamp 14 by widening the hanging members 5 and 5' so that the apertures 3 and 4 of the plates 1 and 2 are correctly below the fluorescent lamp 14. Then the desk lamp 16 is switched on, and the distance between the lense 9 and a printing paper 21 is adjusted by bending a bendable neck portion 17 of the desk lamp 16 in order to obtain an appropriate focus. Then the beam of light is screened by switching off the lamp or by employing some screening means while a printing paper is prepared on an easel mask (not shown). Other succeeding steps are quite same as those of the known method of the photographic enlargement, which are omitted here.

In FIGS. 4, 5, and 6, showing the second embodiment of the present invention, an upper plate 1 has, on its upper surface, a tube-like member 22 which is slightly larger in diameter than a fluorescent lamp, in place of the hanging members 5 and 5' shown in FIGS. 1, 2, and 3 of the first embodiment. The tube-like member 22 has an aperture (not shown), and is positioned so that the aperture of the tube-like member associates with the aforementioned rectangular aperture of the upper plate. In this embodiment, the tube-like member 22, an elongated piece 6, and the upper plate 1 are formed in an integral manner with one another. The upper plate has, on its lower surface, a depressed area 19 which begins and ends with the shorter sides of the upper plate, and is slightly wider than the height of the elongated aperture 3 so that a negative film may be snugly stayed within the depressed area 19. The depressed area may be formed on the upper surface of the lower plate in the same manner as described above, instead of the depression formed on the upper plate as described above.

Tube-like enclosing members 13a and 13b, which are almost same in structure with the members 13a and 13b in the first embodiment, are formed with non-transparent materials and has a small hole 20 on either one of them. The hole 20 is screened with a semi-transparent tape or the like such as a colored cellophane paper. The tube-like member 22 has at its both ends extending portions 18 and 18' which are longitudinally extending outwardly from the both sides of the plates 1 and 2. The extending portions have walls thinner than the tube-like member 22, so that the extending portions may be snugly enclosed by end portions of the tube-like enclosing member 13a and 13b.

Other construction of the instrument in the second embodiment is quite same with the construction shown in the first embodiment, and hence further description is omitted here.

According to the present invention, a photographic enlargement can be operated by employing a fluorescent lamp without injuring the negative film and operated with less consumption of an electric power. Moreover, the instrument of the present invention is so simple in construction that it can be operated with ease.

Though the present invention has been described with reference to the preferred embodiment thereof, many modifications and alterations may be made within the spirit of the present invention.

For example, spiral grooves may be formed at a lower-inside surface of the tubular member 7 and an upper-outside surface of the sub-tubular member 8 so that the tubular member 7 may be spirally engaged with the sub-tubular member 8. This configuration helps an easy and appropriate operation for minute adjustment of focusing by simply turning the sub-tubular member 8.

Moreover, the tubular member or the sub-tubular member 8 may be provided with a screen which is slidable above the upper end of the enlarging lense for the purpose of shielding a beam of light while preparing a printing paper.

The tube-like closure members 13a and 13b may be formed with a plurality of tubes each of which is different in diameter. Alternatively, each tube-like closure member 13 may be made of a resilient sheet material which is curled by itself. In the latter case, the tube-like closure member can be curled around the fluorescent lamp 14 without removing it from the desk lamp 16.

What is claimed is:

1. A photographic enlargement instrument comprising a plate-like negative film carrier having a rectangular aperture corresponding to a frame size of a negative film, means for hanging said negative film carrier from a fluorescent lamp in such a manner that said fluorescent lamp is closely adjacent to said rectangular aperture of said negative film carrier, a tubular member connected to said negative film carrier to enclose said rectangular aperture and having an enlarging lense at the other end thereof, and means for shading said fluorescent lamp except a portion where said fluorescent lamp faces to said rectangular aperture of said negative film carrier.

2. A photographic enlargement instrument as claimed in claim 1, wherein said plate-like negative film carrier comprises an upper plate and a lower plate each having said rectangular aperture, said upper plate and lower plate holding the negative film therebetween and being fastened with each other; said hanging means is connected to said upper plate; and said tubular member is connected to said lower plate.

3. A photographic enlargement instrument as claimed in claim 2, wherein said hanging means is made of a pair of elastic members each having a curvature which resiliently holds the curved outer surface of said fluorescent lamp.

4. A photographic enlargement instrument as claimed in claim 2, wherein said hanging means is an elongated shading tube integral with said upper plate, said shading tube being adapted to enclose said fluorescent lamp and having an aperture same with or larger than, in size, said rectangular aperture of said upper plate.

5. A photographic enlargement instrument as claimed in claim 2, wherein said upper plate has an elongated protrusion at its upper surface which is adapted to abut to an inner surface of a shade cover of a desk-type fluorescent lamp to set said instrument to a predetermined correct position.

6. A photographic enlargement instrument as claimed in claim 2, wherein said shading means is a pair of tubular members which slidably enclose the fluorescent lamp at both sides of said hanging means.

7. A photographic enlargement instrument as claimed in claim 2, wherein said tubular member has an sub-tubular member so that a lower end of said tubular member is connected to an upper end of said sub-tubular member, said sub-tubular member being smaller in diameter than said tubular member, said sub-tubular member being provided with an enlarging lense at the lower end thereof.

8. A photographic enlargement instrument as claimed in claim 2, wherein said upper plate and said lower plate are hinged at one sides thereof, and has a fastener at the other sides thereof.

9. A photographic enlargement instrument as claimed in claim 2, wherein one of said upper and lower plates has a depressed area beginning with one side thereof and ending with the other side thereof, said depression area being wider than said elongated apertures of said plates so that a negative film is snugly stayed within said depression area.

10. A photographic enlargement instrument as claimed in claim 2, wherein said tubular member has a screen which is slidable above said enlarging lense to shield a beam of light of said fluorescent lamp while preparing a printing paper.

11. A photographic enlargement instrument as claimed in claim 6, wherein one of said shading tubular members has a hole to which a semi-transparent material is attached.

* * * * *